United States Patent [19]

Kawasaki et al.

[11] Patent Number: 4,668,551
[45] Date of Patent: May 26, 1987

[54] EVACUATED HEAT INSULATION UNIT AND METHOD OF MANUFACTURING SAME

[75] Inventors: Tamotsu Kawasaki, Yokohama; Tadayoshi Iwasaki, Fujisawa; Takayuki Maeda; Minoru Morita, both of Yokohama, all of Japan

[73] Assignee: Nippon Sanso Kabushiki Kaisha, Tokyo, Japan

[21] Appl. No.: 797,078

[22] Filed: Nov. 12, 1985

[30] Foreign Application Priority Data

Nov. 13, 1984 [JP] Japan .................. 59-239206

[51] Int. Cl.$^4$ ................................ B32B 5/16
[52] U.S. Cl. ...................... 428/69; 156/286; 428/76
[58] Field of Search ............... 156/286; 428/69, 76, 428/68

[56] References Cited

U.S. PATENT DOCUMENTS

| | | | |
|---|---|---|---|
| 3,785,913 | 1/1974 | Hallamore | 428/76 X |
| 4,180,614 | 12/1979 | Angelo et al. | 428/336 |
| 4,192,773 | 3/1980 | Yoshikawa et al. | 426/118 X |
| 4,318,427 | 3/1982 | Cross, Jr. | 428/76 X |
| 4,329,395 | 5/1982 | Pickford | 428/35 X |
| 4,529,638 | 7/1985 | Yamamoto et al. | 428/69 |
| 4,579,223 | 4/1986 | Otsuka et al. | 428/68 X |

*Primary Examiner*—Henry F. Epstein
*Attorney, Agent, or Firm*—Armstrong, Nikaido, Marmelstein & Kubovcik

[57] ABSTRACT

An evacuated insulation unit and a method of manufacturing the same. A zeolite adsorbent is degassed in a vacuum state. The degassed zeolite adsorbent is sealingly packed in a gas impermeable bag in an atmosphere of an adsorption-proof gas. Then, the gas impermeable bag is provided with a communication hole. After the communication hole is provided, the gas impermeable bag is placed into a plastic bag so as to communicate to the plastic bag through the communication hole. A heat insulating material and activated carbon are also placed into the plastic bag. The plastic bag which contains the gas impermeable bag, the heat insulating material and the activated carbon is evacuated immediately after the provision of the communication hole to the gas impermeable bag so that air is prevented from entering the gas impermeable bag. The plastic bag is sealed during evacuation thereof to thereby produce the evacuated insulation unit.

7 Claims, 5 Drawing Figures

EVACUATED HEAT INSULATION UNIT AND METHOD OF MANUFACTURING SAME

BACKGROUND OF THE INVENTION

The present invention relates to an evacuated heat insulation unit (hereinafter referred to as evacuated insulation unit) for use in, for example, refrigerators as a heat insulation panel and a method of manufacturing the evacuated insulation unit.

The evacuated insulation unit for use in refrigerators has a synthetic resin bag containing a heat insulation material, such as a fine perlite powder, in a vacuum state. The evacuated insulation unit has a high heat insulating property or a low thermal conductivity of 0.01 Kcal/m.h. or less since it includes a heat insulation vacuum layer. However, over time, the heat insulating property of the evacuated insulation unit is degraded since a trace amount of air permeates through the plastic bag into the evacuated insulation unit. When the evacuated insulation unit is surrounded and covered with a foamed plastic resin, such as a foamed urethane resin, for securing it to a wall of a refrigerator as a heat insulation member by foaming the resin, air is prevented from entering into the plastic bag. However, Freon gas and carbon dioxide gas which are used for foaming the urethane resin, and which stay in the wall of the refrigerator, permeate through the plastic bag into the evacuated insulation unit. This lowers the degree of vacuum within the evacuated insulation unit. Thus, the heat insulation property of the insulation unit is deteriorated.

In order to avoid to this drawback, it has been proposed to charge an activated carbon into the plastic bag of the evacuated insulation unit together with the perlite powder for adsorbing Freon gas. However, no practical attempt has been made to prevent the evacuated insulation unit from being degraded in the degree of vacuum due to the carbon dioxide gas, as time passes. This results in a poor heat insulation property for the unit.

SUMMARY OF THE INVENTION

Accordingly, it is an object of the present invention to provide an evacuated insulation unit which maintains the initial degree of vacuum thereof for a fairly long period of time without a degradation in the vacuum degree thereof due to carbon dioxide gas, thus providing excellent heat insulation.

It is another object of the present invention to provide an evacuated insulation unit which is capable of being stored after fabrication thereof for a fairly long period of time without degrading its vacuum degree or heat insulation property.

It is still another object of the present invention to provide an evacuated insulation unit which considerably reduces the time necessary for achieving a predetermined degree of vacuum in evacuation of the plastic bag, thereby improving productivity thereof.

It is another object of the present invention to provide a method of manufacturing the evacuated insulation unit described above.

With these and other objects in view, one aspect of the present invention is directed to an evacuated insulation unit including: a vacuum packed plastic bag; a heat insulating material charged into the vacuum packed plastic bag; activated carbon charged into the vacuum packed plastic bag; a gas impermeable bag having a communication hole, the gas impermeable bag placed within the vacuum packed plastic bag to communicate with the vacuum packed plastic bag through the communication hole; and a zeolite adsorbent charged into the gas impermeable bag wherein the zeolite adsorbent is subjected to gas replacement with an adsorption-proof gas before the gas impermeable bag is packed within the plastic bag.

Another aspect of the present invention is directed to a method of manufacturing an evacuated insulation unit. A zeolite adsorbent is degassed in a vacuum state. The degassed zeolite adsorbent is sealingly packed in a gas impermeable bag in an atmosphere of an adsorption-proof gas. Then, the gas impermeable bag is provided with a communication hole. After the communication hole is provided, the gas impermeable bag is placed into a plastic bag so as to communicate with the plastic bag through the communication hole. A heat insulating material and activated carbon are also placed into the plastic bag. The plastic bag which contains the gas impermeable bag, the heat insulating material and the activated carbon is evacuated immediately after the provision of the communication hole to the gas impermeable bag so that air is prevented from entering the gas impermeable bag. The plastic bag is sealed during the evacuation thereof to thereby produce the evacuated insulation unit.

DETAILED DESCRIPTION OF THE PREFERRED EMBODIMENTS

Figure 1:
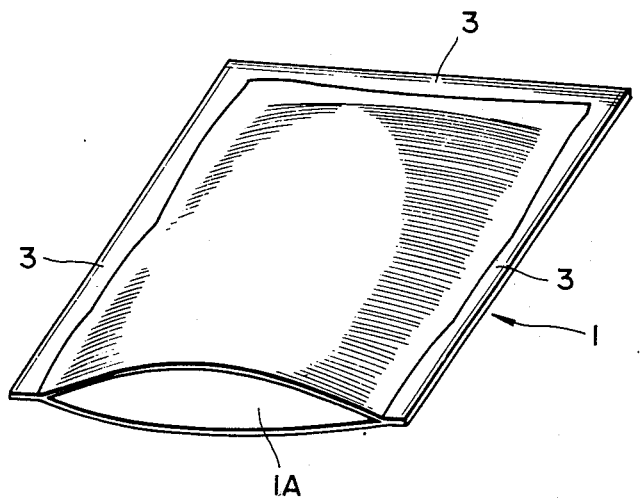
FIG. 1 is a perspective view of a plastic film bag, with its one end opened, used for an evacuated insulation bag according to the present invention.
Figure 2:
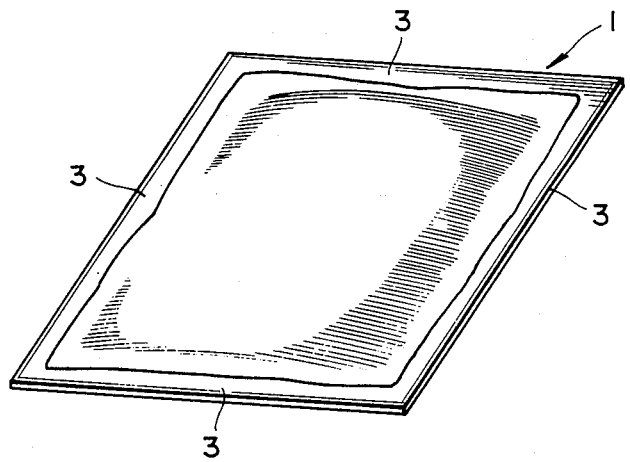
FIG. 2 is a perspective view of the evacuated insulation unit according to the present invention
Figure 3:
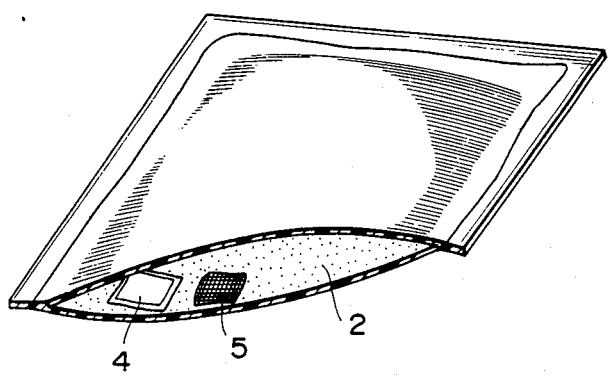
FIG. 3 is a perspective view, partly in section, of the evacuated insulation unit in FIG. 2.
Figure 4:
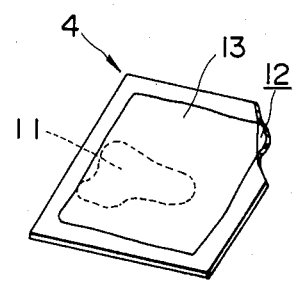
FIG. 4 is an enlarged perspective view of the adsorption bag in FIG. 2, which is provided at its corner with a communication opening.

In FIGS. 1 to 3, the reference numeral 1 designates a plastic film bag, into which is charged a heat insulating material 2 such as a fine perlite powder together with both an adsorption bag 4 and a gas-permeable bag 5 having active carbon in it. The plastic film bag 1 may include a laminated film bag having a metallic film or foil laminated to it. The adsorption bag 4 includes a gas-impermeable bag 13 made of a plastic film, having a low water permeability, such as a polyethylene film. The bag 13 has an adsorbent 11 packed in it, the adsorbent is used to adsorb carbon dioxide gas. The gas-impermeable bag 13 is provided with a communication hole 12 therethrough. The permeable bag 5 may be made from kraft paper, cotton cloth, etc. The active carbon which is contained in the permeable bag 5 is to adsorb Freon gas. The active carbon mah be mixed with the heat insulating material 2 without using the permeable bag 5. The plastic film bag 1 is heat sealed at its four sides 3 as shown in FIG. 2 while it is conventionally evacuated in a vacuum chamber which is not shown. Thus, the heat insulating material 2, the adsorption bag 4 and the gas permeable bag 5 are contained in the plastic film bag 1 in a vacuum state.

In the present invention, the heat insulating material 2 may include: fine powder such as fine perlite powder and a microballoon; an inorganic material powder such as silica, magnesium carbonate, diatomaceous earth and calcium silicate; a moulding of calcium silicate; glass fiber; asbestos; and a heat insulating material such as a foamed plastic material.

The plastic film bag 1 is preferably made of a film material which has a gas permeability which is as little as possible and which is easily sealed by heat sealing. Such a material includes, for example, a polyester resin, polyvinylidene chloride, polypropylene, polyvinyl alcohol, etc. Preferably, the film is vapor deposited with a metallic film or laminated with a metallic foil. The plastic film bag 1 may include a heat sealed layer made of a polyolefin, such as a polyethylene and a polypropylene, a polyamide, such as nylon 11 and nylon 12, a polyacrylonitrile or a similar synthetic resin. Further, use may be made of: a thermosetting resin such as a phenolic plastic, melamine resin, furan resin, urea resin, unsaturated polyester resin, silicone resin and epoxy resin; and a thermoplastic resin such as a vinyl chloride resin, vinylidene chloride, polystyrene, AS resin, ABS resin, fluorocarbon resin, methacrylic resin, polyamide resin, and thermoplastic polyester.

The carbon dioxide adsorbent 11 according to the present invention may include a synthetic zeolite adsorbent such as molecular sieve 4 Å, 5 Å and 13X.

The gas impermeable bag 13 may be a paper bag laminated with a synthetic resin film having a low gas permeability such as a low density polyethylene film.

The evacuated insulation unit is produced as follows. The heat insulation material 2 is charged into a plastic bag 1 through an open end 1A together with a gas-permeable bag 5 containing activated carbon, the plastic bag 1 being heat sealed at its three sides 3 (FIG. 1). At the same time, the adsorption bag 4 is placed within the plastic bag 1 with one corner broken to form a communication opening 12 to communicate with the interior of the plastic bag 1. Then, the plastic bag 1 is placed within a conventional vacuum packer, where the bag 1 is evacuated and heat sealed at its open end 1A at a predetermined degree of vacuum, so that a desired evacuated plastic insulation unit is produced. The vacuum degree of the evacuated insulation unit thus produced is typically around $10^{-1}$ Torr.

When the heat insulation material 2 is in the form of a powder, it may be packed into a gas-permeable bag such as a bag formed of kraft paper and cotton cloth. Then the gas-permeable bag may be placed within the plastic bag 1. With such a construction, entrainment of the powder material 2 is prevented during evacuation of the plastic bag 1.

The zeolite adsorbent contained in the adsorbent bag 4 easily adsorbs nitrogen gas with a strong adsorption strength and hence it is impossible to completely remove the nitrogen gas from a zeolite adsorbent which has been exposed to the atmosphere, within a relatively short period of time, when the plastic bag 1, in which the zeolite adsorbent is contained, is evacuated. Thus, it is liable to deteriorate the degree of vacuum within the plastic bag 1 vacuum sealed since part of the nitrogen gas adsorbed in the zeolite adsorbent is separated and enters into the bag 1, resulting in a degraded heat insulation property. In order to avoid this drawback, the adsorption bag 4 according to the present invention undergoes the following treatments. The gas-impermeable bag 13 which has a zeolite adsorbent charged into it is evacuated for a sufficient period of time to remove nitrogen gas from the zeolite adsorbent and then an adsorption-proof gas which is less liable to be adsorbed in the zeolite adsorbent is introduced into and sealed in the gas-impermeable bag 13 at a normal pressure. As the adsorption-proof gas, use may be made of: helium gas; neon gas; hydrogen gas; n-paraffin gas and i-olefin gas, both having more than 3 carbon atoms; naphthene gas having more than 4 carbon atoms; benzenes and other similar lower aromatic hydrocarbons; and alcohols. The degassing of the zeolite adsorbent may be performed by heating it in a vacuum state while evacuating the gas-impermeable bag 13 containing the zeolite adsorbent as described above.

With such treatments, little nitrogen gas is retained in the zeolite adsorbent packed in the gas-impermeable bag 13 and the gas sealed in it, such as helium gas, is rapidly exhausted during evacuation of the plastic bag 1. Thus, little gas is degassed from the zeolite adsorbent during use of the evacuated insulation unit, so that the evacuated insulation unit is kept at a predetermined vacuum degree and thereby maintains its excellent heat insulation property for a fairly long period of time.

EXAMPLE 1

Two evacuated insulation units 450 mm wide, 450 mm long and 20 mm thick were prepared in the following manner, each unit using a laminated bag. The laminated bag was made of a laminated film of 12μ polyethylene terephthalate film vapor deposited with a 500Å aluminum film. A fine perlite powder was charged in an amount of 1.5 kg into the laminated bag. A kraft paper package which contained 20 g of activated carbon, produced and sold under a tradename "Diasoab F-100" by Mitsubishi Kasei Kogyo Kabushiki Kaisha, Japan, was then placed into the laminated bag. A synthetic zeolite (molecualr sieve 4A), produced and sold under a tradename "Zeolum 4A" by Toyosouda Kogyo Kabushiki Kaisha, Japan, was placed in an amount of 20 g within a vacuum chamber where it was evacuated to 0.03 Torr at 100° C. for 40 hours. Immediately after this treatment, the zeolite was sealingly packed in a paper bag containing helium gas at a pressure of 1 atm, the paper bag being laminated with a 30μ polyethylene film by heat sealing. Immediately after the film bag having the zeolite thus sealed in it was provided with a communication hole, it was placed within the plastic laminated bag, containing the fine perlite powder and the activated carbon package, which bag was immediately evacuated in the vacuum packer. After 10 minutes from the start of the evacuation, the vacuum degree of the vacuum packer was 0.10 Torr and at this pressure the opened portion of the plastic bag was heat sealed to produce an evacuated insulation unit.

Two evacuated insulation units thus prepared were determined as to initial thermal conductivity $\lambda_1$. One evacuated insulation unit was then allowed to stand in the atmosphere and after 72 hours it was determined as to thermal conductivity $\lambda_2$. The results are given in Table 1 together with the difference $\Delta\lambda$ between thermal conductivities $\lambda_1$ and $\lambda_2$. Another evacuated insulation unit was placed in an atmosphere of a gas mixture consisting of 80 volume % of Freon 11 gas and 20 volume % of carbon dioxide gas for 72 hours and was then determined as to thermal conductivity $\lambda_2$. The results are given in Table 2 together with the difference $\Delta\lambda$ between thermal conductivities $\lambda_1$ and $\lambda_2$.

COMPARATIVE EXAMPLES 1 and 2

Evacuated insulation units were prepared in the same manner as in Example 1 except that in Comparative Example 1 the evacuated and heated synthetic zeolite was packed in the film bag in the atmosphere and that in Comparative Example 2 no zeolite adsorbent was used. Similar tests as to thermal conductivity were carried out and the results are set forth in Tables 1 and 2.

From Table 1, it is clear that the evacuated insulation unit according to the present invention was rather lower in the achieved vacuum degree of the initial vacuum degree, and hence in the initial thermal conductivity, than the evacuated insulation units in Comparative Examples 1 and 2. It was noted that the evacuated insulation unit in Comparative Example 1 was equal in the initial thermal conductivity to the evacuated insulation unit in Comparative Example 2 although the former was lower in the achieved vacuum degree than the latter.

From Tables 1 and 2, it is noted that the reduction in thermal conductivity for 72 hours ($\lambda_2$) of the evacuated insulation units according to the present invention was 0.2 Kcal/m.h. °C. in the atmosphere of both air and the mixture gas and was fairly small as compared to $\lambda_2$ of the evacuated insulation units in Comparative Examples 1 and 2. Thus, it is clear that the evacuated insulation units in Example 1 were superior as to degradation of the vacuum degree and in heat insulation property to the evacuated insulation units in Comparative Examples 1 and 2. To the contrary, it was noted that in Comparative Example 2 the evacuated insulation unit which contained no zeolite adsorbent and which was allowed to stand in the atmosphere of the gas mixture consisting of Freon Gas and carbon dioxide gas exhibited a rather larger degradation in thermal insulation property than the evacuated insulation unit which was allowed to stand in the atmosphere.

EXAMPLE 2

Four evacuated insulation units were prepared in the same manner as in Example 1 except that 5 g of the synthetic zeolite was used. The insulation units thus prepared were allowed to stand in the atmosphere of carbon dioxide gas at a pressure of 1 atm. These insulation units were determined as to the degree of vacuum at certain time intervals and the results are plotted in the graph in FIG. 3.

COMPARATIVE EXAMPLE 3

Figure 5:
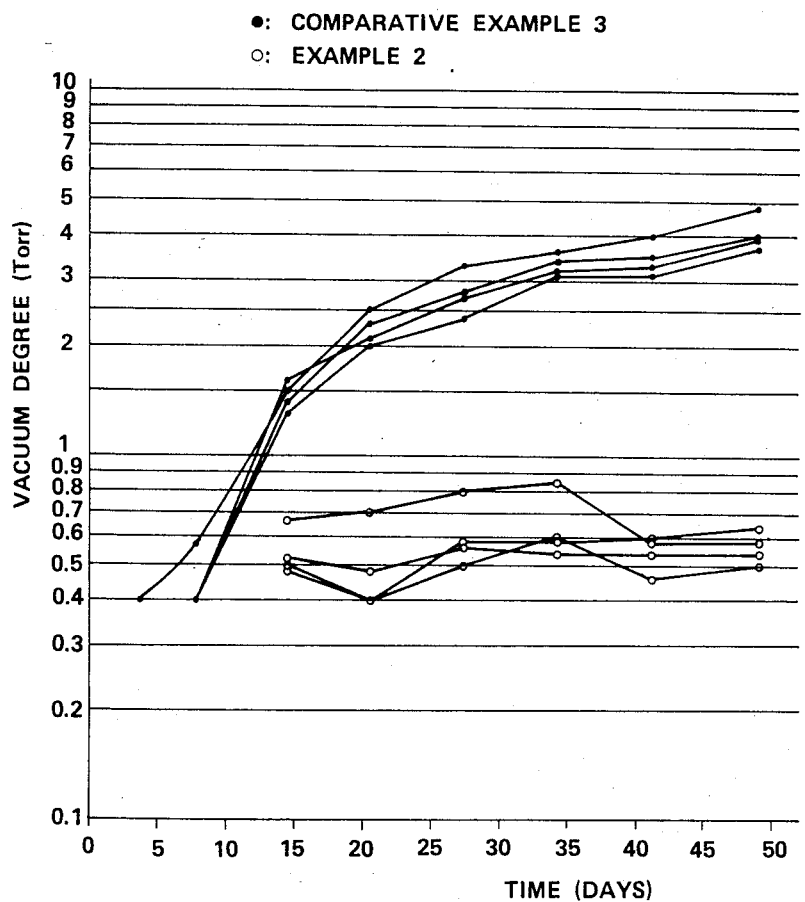
FIG. 5 is a graph showing the vacuum degree of the evacuated insulation units according to the present invention and the prior art over extended periods of time.

Four evacuated insulation units were prepared in the same manner as in Comparative Example 2. The insulation units thus prepared were allowed to stand in the atmosphere of carbon dioxide gas at a pressure of 1 atm. These insulation units were determined as to the degree of vacuum at certain time intervals and the results are also plotted in the graph in FIG. 5.

TABLE 1

|  | Example 1 | Comparative Example 1 | Comparative Example 2 |
|---|---|---|---|
| Achieved degree of vacuum (Torr) | 0.10 | 0.13 | 0.12 |
| Initial thermal conductivity $\lambda_1$ ($\times 10^{-3}$ Kcal/m. h. °C.) | 6.8 | 7.1 | 7.1 |
| Thermal conductivity after 72 hours $\lambda_2$ ($\times 10^{-3}$ Kcal/m. h. °C.) | 7.0 | 7.8 | 8.1 |
| $\Delta\lambda = \lambda_2 - \lambda_1$ ($\times 10^{-3}$ Kcal/m. h. °C.) | 0.2 | 0.87 | 1.0 |

TABLE 2

|  | Example 1 | Comparative Example 1 | Comparative Example 2 |
|---|---|---|---|
| Achieved degree of vacuum (Torr) | 0.10 | 0.13 | 0.12 |
| Initial thermal conductivity $\lambda_1$ ($\times 10^{-3}$ Kcal/m. h. °C.) | 6.8 | 7.1 | 7.1 |
| Thermal conductivity after 72 hours $\lambda_2$ ($\times 10^{-3}$ Kcal/m. h. °C.) | 7.0 | 7.9 | 8.6 |
| $\Delta\lambda = \lambda_2 - \lambda_1$ ($\times 10^{-3}$ Kcal/m. h. °C.) | 0.2 | 0.8 | 1.5 |

What is claimed is:

1. An evacuated insulation unit comprising:
   a vacuum packed plastic bag;
   a heat insulating material charged into the vacuum packed plastic bag;
   activated carbon charged into the vacuum packed plastic bag;
   a gas impermeable bag having a communication hole, said gas impermeable bag placed within the vacuum packed plastic bag to communicate with the vacuum packed plastic bag through said communication hole; and
   a zeolite absorbent charged into the gas impermeable bag, wherein the zeolite adsorbent is subjected to gas replacement with an adsorption-proof gas before the gas impermeable bag is packed within the vacuum packed plastic bag.

2. An evacuated insulation unit was recited in Claim 1, wherein said gas impermeable bag is a paper bag laminated with a polyolefin film.

3. An evacuated insulation unit as recited in Claim 1 or 2, wherein said vacuum packed plastic bag is made of a synthetic resin film laminated with one of a metallizing film and a metallic foil.

4. A method of manufacturing an evacuated insulation unit, comprising the steps of:
   degassing a zeolite adsorbent in a vacuum state;
   sealingly packing said degassed zeolite adsorbent in a gas impermeable bag in an atmosphere of an adsorption-proof gas;
   providing a communication through hole to said gas impermeable bag sealingly containing said zeolite adsorbent,
   after the step of providing said communication hole, placing said gas impermeable bag into a plastic bag so as to communicate to the plastic bag through said communication hole;
   placing a heat insulating material and activated carbon into said plastic bag;
   evacuating said plastic bag containing said gas impermeable bag, said heat insulating material and said activated carbon immediately after the provision of the communication hole to the gas impermeable bag so that air is prevented from entering the gas impermeable bag through said communication hole; and thereafter, sealing said plastic bag during evacuation of the plastic bag to thereby produce the evacuated insulation unit.

5. A method as recited in claim 4, wherein said degassing step comprising heating the zeolite adsorbent.

6. A method as recited in claim 5, wherein said plastic bag is made of a synthetic resin film laminated with one of a metallizing film and a metallic foil.

7. A method as recited in claim 4, wherein said adsorption-proof gas comprises a gas selected from the group consisting of helium gas; neon gas; hydrogen gas; n-paraffin gas having more than 3 carbon atoms; i-olefin gas having more than 3 carbon atoms; naphthene gas having more than 4 carbon atoms, lower aromatic hydrocarbon gas; and alcohol gas.

* * * * *